United States Patent
Brown et al.

(10) Patent No.: US 9,686,252 B2
(45) Date of Patent: *Jun. 20, 2017

(54) SECURITY COMMAND FOR REMOTE EXECUTION AT TARGET DEVICE

(71) Applicant: Blackberry Limited, Waterloo (CA)

(72) Inventors: Michael Kenneth Brown, Fergus (CA); Scott William Totzke, Waterloo (CA); Michael Grant Kirkup, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,696

(22) Filed: Sep. 9, 2014

(65) Prior Publication Data

US 2014/0380045 A1    Dec. 25, 2014

Related U.S. Application Data

(63) Continuation of application No. 11/610,621, filed on Dec. 14, 2006, now Pat. No. 8,856,511.

(51) Int. Cl.
*H04L 29/06* (2006.01)

(52) U.S. Cl.
CPC .......... *H04L 63/06* (2013.01); *H04L 63/0435* (2013.01); *H04L 63/0442* (2013.01)

(58) Field of Classification Search
CPC combination set(s) only.
See application file for complete search history.

(56) References Cited

U.S. PATENT DOCUMENTS

| | | | |
|---|---|---|---|
| 5,748,084 A | 5/1998 | Isikoff | |
| 6,263,388 B1 | 7/2001 | Cromer et al. | |
| 6,334,150 B1 | 12/2001 | Cromer et al. | |
| 6,463,464 B1 | 10/2002 | Lazaridis et al. | |
| 6,510,515 B1 | 1/2003 | Raith | |
| 6,778,828 B1* | 8/2004 | Chander et al. | H04W 8/265 380/247 |
| 6,928,551 B1 | 8/2005 | Lee et al. | |
| 7,272,674 B1* | 9/2007 | Nandi | H04L 67/1097 370/216 |
| 7,330,712 B2 | 2/2008 | Kirkup et al. | |
| 7,366,156 B2 | 4/2008 | Ahn | |
| 8,249,016 B1 | 8/2012 | Kalbag et al. | |
| 2001/0013071 A1 | 8/2001 | Lazaridis et al. | |
| 2001/0045884 A1 | 11/2001 | Barrus et al. | |
| 2002/0027992 A1 | 3/2002 | Matsuyama et al. | |
| 2002/0049818 A1* | 4/2002 | Gilhuly | G06Q 10/107 709/206 |
| 2002/0154781 A1 | 10/2002 | Sowa et al. | |
| 2003/0009480 A1* | 1/2003 | Lin | G06F 17/30115 |

(Continued)

*Primary Examiner* — Taghi Arani
*Assistant Examiner* — Phy Anh Vu
(74) *Attorney, Agent, or Firm* — Integral IP; Miriam Paton; Amy Scouten (57) ABSTRACT

A system and method implemented at a server system, for securely wiping a remote mobile device after the device registration has been removed from the server system. Prior to removal of the device registration from the server system, a "pre-packaged" command is created and stored at the server system. In the event that it is determined, after removal of the registration, that the device should be wiped or disabled, means are provided for an administrator to issue the previously stored command to the target mobile device.

21 Claims, 4 Drawing Sheets

(56) References Cited

U.S. PATENT DOCUMENTS

| | | | |
|---|---|---|---|
| 2003/0061518 A1 | 3/2003 | Yamaguchi et al. | |
| 2003/0097596 A1 | 5/2003 | Muratov et al. | |
| 2003/0132285 A1* | 7/2003 | Blancas | G06Q 20/02 235/380 |
| 2003/0147267 A1* | 8/2003 | Huttunen | G06F 21/6209 365/63 |
| 2004/0196978 A1 | 10/2004 | Godfrey et al. | |
| 2005/0069139 A1* | 3/2005 | Higurashi | G06F 21/10 380/284 |
| 2005/0163320 A1 | 7/2005 | Brown et al. | |
| 2005/0191988 A1* | 9/2005 | Thornton | H04W 12/12 455/404.1 |
| 2005/0207578 A1 | 9/2005 | Matsuyama et al. | |
| 2005/0221799 A1 | 10/2005 | Tervo et al. | |
| 2005/0223083 A1 | 10/2005 | Muraki | |
| 2005/0226423 A1 | 10/2005 | Li et al. | |
| 2005/0227669 A1 | 10/2005 | Haparnas | |
| 2006/0021059 A1* | 1/2006 | Brown | G06F 21/57 726/26 |
| 2006/0069737 A1 | 3/2006 | Gilhuly et al. | |
| 2006/0129845 A1* | 6/2006 | Nakashima | G06F 12/1408 713/191 |
| 2006/0147043 A1 | 7/2006 | Mann et al. | |
| 2006/0150241 A1* | 7/2006 | Huh et al. | H04L 9/32 726/4 |
| 2006/0225126 A1 | 10/2006 | Brown et al. | |
| 2007/0038680 A1* | 2/2007 | Casey | G06F 21/6209 |
| 2007/0056043 A1 | 3/2007 | Onyon et al. | |
| 2007/0083935 A1* | 4/2007 | Uchikawa | G06F 21/6227 726/26 |
| 2008/0148042 A1 | 6/2008 | Brown et al. | |
| 2010/0030821 A1* | 2/2010 | Brown | G06F 17/30 707/E17.007 |
| 2012/0047521 A1* | 2/2012 | Huang | H04L 41/0213 719/330 |
| 2012/0184248 A1* | 7/2012 | Speede | H04W 4/14 455/411 |
| 2012/0260086 A1 | 10/2012 | Haggerty et al. | |
| 2014/0141819 A1* | 5/2014 | Wang | H04W 12/12 455/466 |
| 2015/0260529 A1* | 9/2015 | Petersen | G01C 21/26 701/522 |
| 2015/0339035 A1* | 11/2015 | Lei | G06F 3/04883 715/765 |
| 2016/0062668 A1* | 3/2016 | Park | G06F 3/04842 715/771 |

* cited by examiner

Security Administrator

| Users | Deleted Users |

| Name | DeviceID | Status | Last Contact Time | 510 |
|---|---|---|---|---|
| Rob Bender | AE0003C5 | Running | 20061131 00:31:23 | |
| Amy Wong | AC56000E | Running | 20061203 12:01:33 | |
| Phil Fry | 3E005600 | Running | 20061203 18:34:00 | |

Mailbox: o=daystrom/cn=awong
Mail Server: M5
IT Policy Name: a_wong_itpol      520
IT Policy Status: Applied Successfully
Last IT Policy Update: 20061123 15:22:04

Options
Assign IT Policy
Reset Master Key
Set Password and Lock Handheld
Erase Data and Disable Handheld
Remove User

Security Administrator

| Users | Deleted Users |

| Name | DeviceID | Deleted | 560 |
|---|---|---|---|
| Hugh Farnsworth | B233AE00 | 20061130 17:04:15 | |

Erase Data and Disable Handheld
This will send a command to Hugh Farnsworth's device to disable itself and erase all previously stored information. This command will not be successful if the device has been activated at another server.

Are you sure you want to do this?      580

[ Yes ]   [ No ]

Options
Erase Data and Disable Handheld
Delete Stored Commands
570

Figure 6

SECURITY COMMAND FOR REMOTE EXECUTION AT TARGET DEVICE

CROSS-REFERENCE TO RELATED APPLICATIONS

This application is a continuation of U.S. patent application Ser. No. 11/610,621, filed Dec. 14, 2006. The entire contents of U.S. application Ser. No. 11/610,621 is hereby incorporated by reference.

TECHNICAL FIELD

The present invention relates generally to the field of computer and network security, and in particular to preventing access to data stored on a mobile device by unauthorized users.

DESCRIPTION OF THE RELATED ART

Data stored in the memory of a communication and/or computing device, such as a mobile communication device, personal digital assistant (PDA), smartphone, laptop computer, and the like, may include data of a sensitive or critical nature that is preferably accessible only by authorized users. Such data may include e-mail, calendar information, contact information in an address book, and other files including but not limited to data files created at the device or received by an authorized user at the device. One means of securing data is by encryption, using a key such as a password or a content protection key derived or secured using a user-entered password.

On occasion, it may be necessary to prevent access to data and/or applications stored or executable on a client device by deleting the data and/or applications. For example, when a client device previously used by a first individual is redeployed to another individual within the same organization, it may be desirable to delete the content of the data stores on the device associated with the first user. While the client device itself may be configured to allow an authorized user to destroy some or all data or applications stored on the device himself, a server that is authoritative for that client device may be configured to permit an administrator to issue security commands from the server to the client device to accomplish these tasks. The process of deleting data and/or applications from a mobile communication device may be described as "wiping" the device. The process of disabling user access to the data and/or applications on the mobile communication device is often referred to as "disabling" the device. Colloquially, carrying out both processes may be referred to as "killing" the device. In any event, the typical result is that the client device is rendered temporarily unusable, either because data and/or applications required for the operation of the device may have been deleted by the wiping process and must be reprovisioned before the device can be operable again, or because the disablement of the device prevents a device user from accessing the systems on the device. Since it is not desirable for the client device to comply with any security instruction received from any non-authoritative server, the client device may be configured to execute only those security instructions that are received from an authoritative server. An authoritative server is one at which the authorized user and the client device are registered, such that the server is configured to transmit commands that will be received and executed by the client device.

Because security commands will only be executed by the client device so long as the server transmitting the command is authoritative for the client, this process of wiping or disabling the client device from the server is effective only as long as the server is authoritative for that client device. However, the circumstance may arise where the client device registration at the server is deleted before a wiping or disabling command is issued to the client device, resulting in the removal of all information regarding the client device from the server. In that case, the server would no longer be authoritative for that client device, which may be problematic. For example, in the case where the employment of a user of a client device is terminated, the administrator may, as a first action, delete the user registration at the authoritative server. After that action, it may be necessary to wipe and/or disable the client device if it is determined that the user did not return the device to the organization. However, because the user's registration had already been deleted and the server had accordingly lost its status as the authoritative server for that client device, it will not be possible for the administrator to issue a "kill" command to the client device. The result is that the client device may be at large, and the sensitive data stored thereon is potentially accessible by the terminated user or by another person who manages to bypass any content protection or password security on the client device.

It is therefore desirable to provide a system and method for wiping or disabling the client device after the associated server ceases to be authoritative for that device.

BRIEF DESCRIPTION OF THE DRAWINGS

In drawings which illustrate by way of example only a preferred embodiment of the invention.

DETAILED DESCRIPTION OF THE INVENTION

Figure 1:
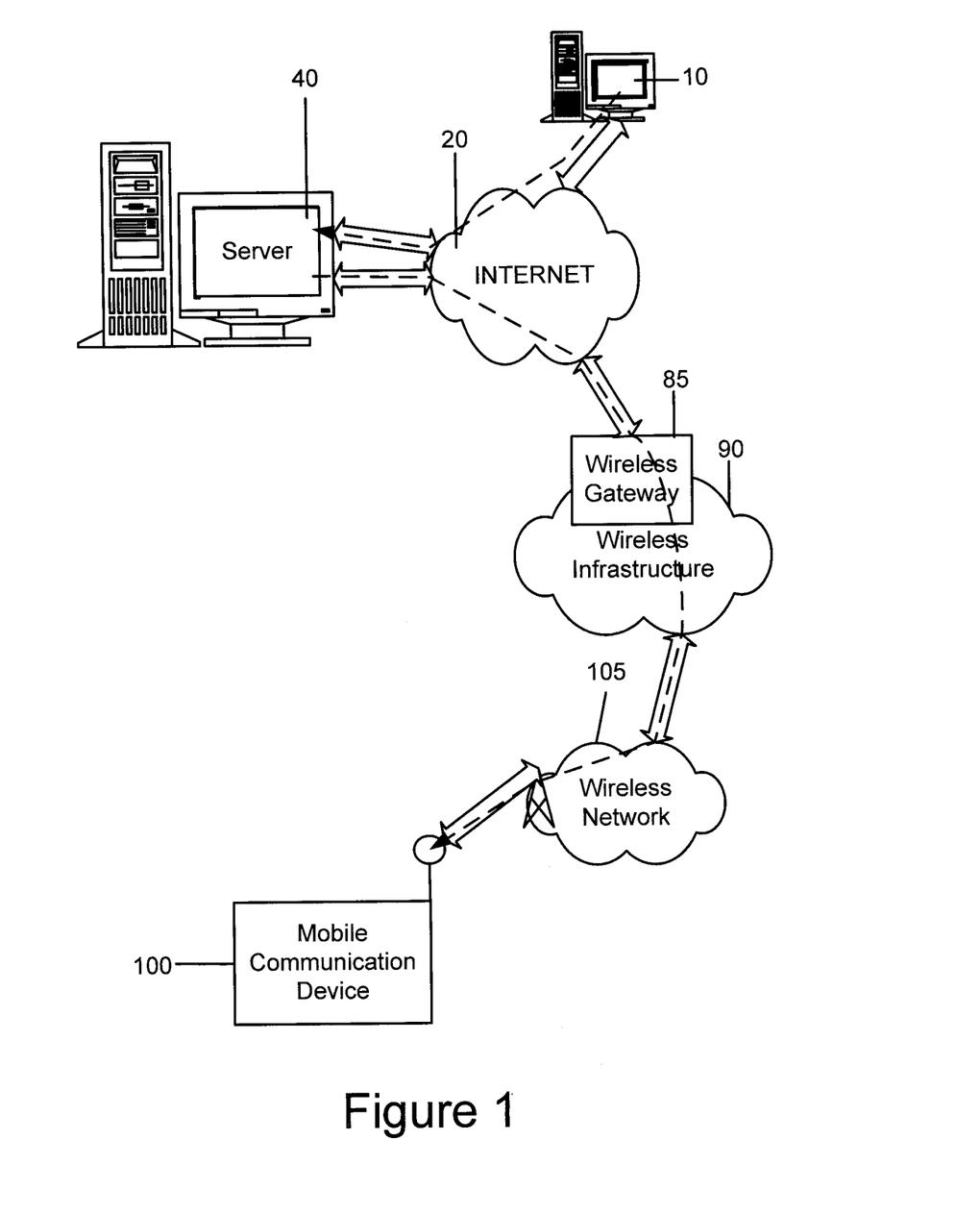
FIG. 1 is a schematic of a network for implementing a system and method of preventing access to data.

Referring to FIG. 1, an overview of an exemplary communication system for use with the embodiments described below is shown. One skilled in the art will appreciate that there may be many different topologies, but the system shown in FIG. 1 helps demonstrate the operation of the systems and methods described in the present application. There may be many communications devices connected to the system, that are not shown in the simple overview of FIG. 1.

FIG. 1 shows first communication device, here a client personal computer 10, a network, here the Internet 20, a server system 40, a wireless gateway 85, wireless infrastructure 90, a wireless network 105 and a second communication device, here a client mobile communication device 100. It will be appreciated by those skilled in the art that the devices referred to herein as client devices, mobile devices, mobile communication devices, communication devices, computing devices, or data storage devices may comprise devices whose main function is directed to data or voice communication over a network and data storage, but may also be provided with personal or productivity applications, or devices whose main function is directed to computing or executing productivity applications, but are also adapted to enable a user to communicate over a network. Such devices include, but are not limited to, laptop and notebook computers, PDAs, smartphones, and the like. Most preferably, the client device is capable of communicating over a wireless network, as set out in further detail below.

A client personal computer 10 may, for example, be connected to an ISP (Internet Service Provider) on which a user of the system has an account, located within a company, possibly connected to a local area network (LAN), and connected to the Internet 20, or connected to the Internet 20 through a large ASP (application service provider). Those skilled in the art will appreciate that the systems shown in FIG. 1 may instead be connected to a wide area network (WAN) other than the Internet.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the client mobile device 100 via wireless transmission, typically at a radio frequency (RF), from a base station in the wireless network 105 to the client mobile device 100. The particular network 105 may be any wireless network over which messages may be exchanged with a mobile communication device. The client mobile device 100 may also receive data by other means, for example through a direct connection to a port provided on the mobile device 100, such as a Universal Serial Bus (USB) link.

The server system 40 may be implemented, for example, on a network computer within the firewall of a corporation, a computer within an ISP or ASP system or the like. The server system 40 may act as the application, network access, and/or file server for one or more communication devices. In the embodiment described below, the server system 40 also acts as an authoritative server for managing IP policies and issuing software and security-related commands to the client devices 10, 100. The mobile device 100, if it is configured for receiving and possibly sending e-mail, may be associated with an account on the server system 40. The software products and other components that are often used in conjunction with the functions of the server system 40 described herein are not shown in FIG. 1, as they do not directly play a role in the system and method described below. If the server system 40 acts as a message server, the server system 40 may support either a so-called "pull" or "push" message access scheme, wherein the mobile device 100 must request that stored messages be forwarded by the message server to the mobile device 100, or the server system 40 may be provided with means for automatically redirecting messages addressed to the user of the mobile device 100 as they are received, respectively.

The server system 40 may be used to provide administrative functions for the client devices 10 and 100, for example by establishing and transmitting information technology (IT) policies. In the preferred embodiment, administrator access is provided at the server system 40 for issuing various commands relating to the management and security features of the client devices 10, 100, although the system and method described herein may be implemented from another device on the network, if such administrator-level access is provided at the other device. For ease of reference, the various administrative functions and registration of client devices at a server will be described with reference to the server system 40.

Figure 6:
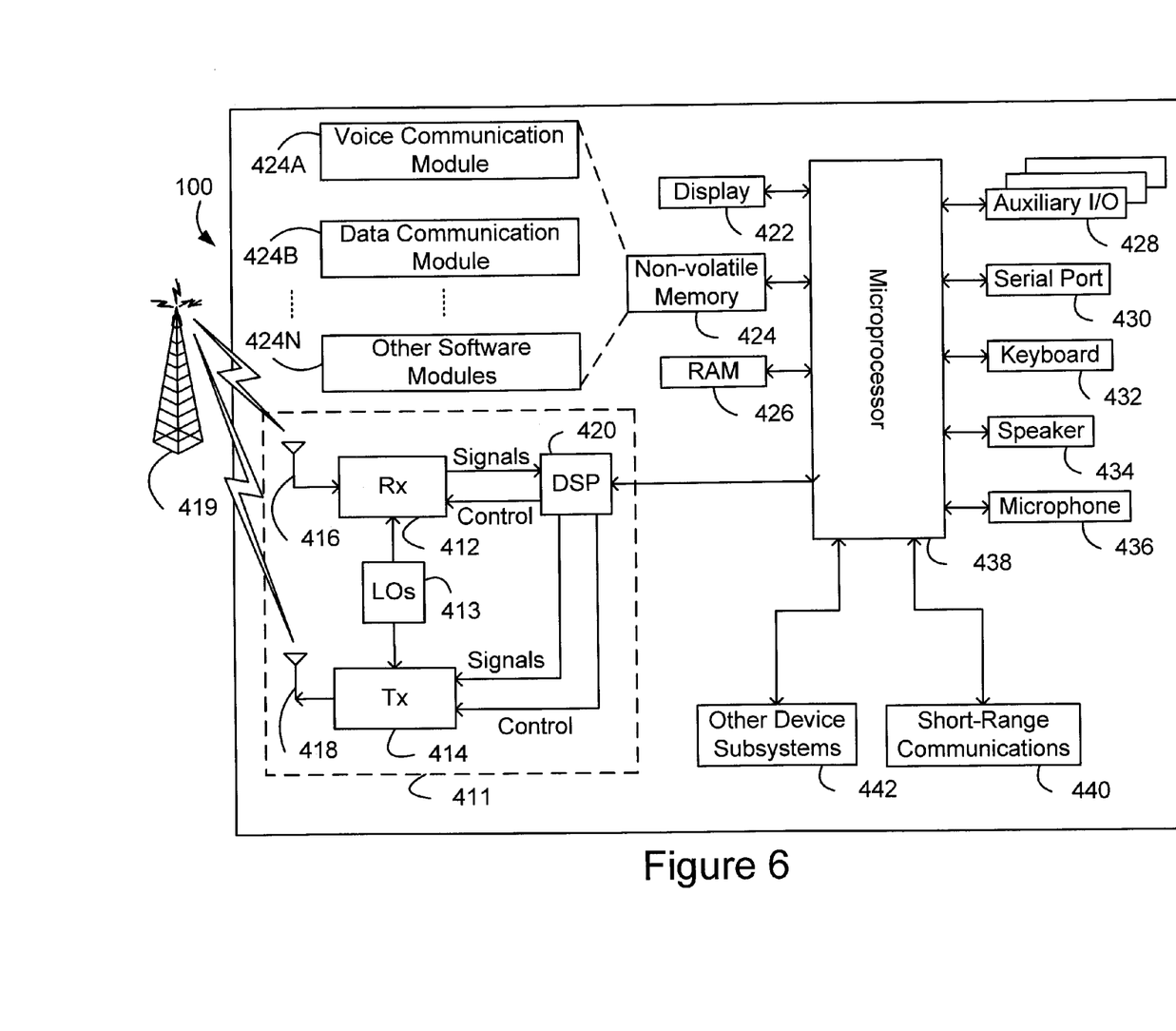
FIG. 6 is a block diagram of a mobile communication device for use with the methods illustrated in FIGS. 2, 3, and 4.

The client device 10, 100 may store data in an erasable persistent memory, for example flash memory. With reference to FIG. 6, which depicts one embodiment of a mobile communication device 100 and is described in detail below, data may be stored in non-volatile memory 424. The data stored on the client device 10, 100 may comprise user application data, for example e-mail messages, address book data, contact information, calendar appointments and associated information, text files, image files, and other data generated by either the user at the client device 10, 100, or received and stored by the client device 10, 100. The data may be stored in encrypted form in the memory, in which case a content encryption key for encrypting the data may be provided; preferably, the content encryption key is not stored in the clear, but is either stored itself in encrypted form in the erasable persistent memory, or is generated at least once each user session when access to the encrypted data is required. Generation of the content encryption key may include derivation of the content encryption key in whole or in part from a user-entered password, such as a password entered by the user to unlock the client device; generation of the content encryption key may also include decrypting an encrypted version of the content encryption key stored in the memory 424 using the user-entered password. Whether data is encrypted or not, the data may comprise a subset of critical data that the user, or the administrator or organization issuing the client device 10, 100 to the user, does not wish to be accessible in the event the client device 10, 100 should fall into the hands of a rogue or unauthorized user.

Figure 5A:
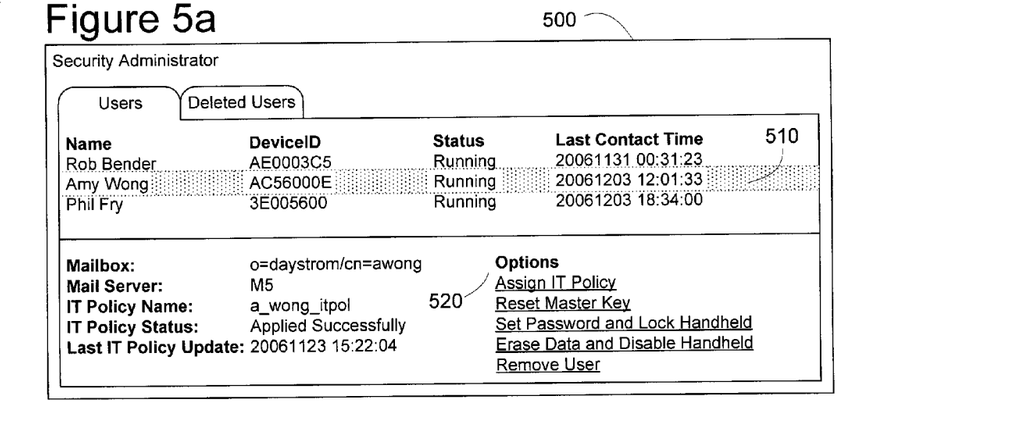
FIGS. 5a and 5b are schematic representations of user interfaces for issuing commands to prevent access to data from a server.

Such data may include data for managing communication with the server system 40, for example addressing information for addressing data packets, commands, or other messages to the server system 40. In the preferred embodiment, this data includes a command decryption key for decrypting commands received from the server system 40. The command decryption key is preferably established when the user and the client device 10, 100 are registered with the server system 40, and may be established when an IT policy is communicated from the server system 40 to the client device 10, 100. The registration data at the server system 40 associated with the client device 10, 100 may include identifiers identifying both the registered user and the client device 10, 100. An example of such identifiers is shown in FIG. 5a, which is an example of a user interface 500 at the server system 40 for administering the server system 40 and registered users. As can be seen in the interface 500, a single entry such as the highlighted entry 510 comprises a user identifier ("Name"), a client device identifier ("DeviceID"), as well as other relevant information such as the status of the client device ("Status") and the last time the server system 40 communicated with the client device 10, 100 ("Last Contact Time"). The registration data further comprises a command encryption key, not shown, which corresponds with the command decryption key at the client device 10, 100, as well as other data relating to the status of the IT policy applied to the device, the date and time of last communication between the server 40 and the device 10, 100, and information regarding the associated mailbox and mail server for the user. The registration data also preferably includes an address identifier for addressing messages and data packets to the device 10, 100. An example of an address identifier is a media access control (MAC) address assigned to the device 10, 100. Commands that are transmitted from the server system 40 to the client device 10, 100 are encrypted by the command encryption key. Various means of generating and providing encryption and decryption keys to the server system 40 and the client device 10, 100 will be known to those skilled in the art. For example, if a symmetric key is used, the command encryption key and the command decryption key will be the same. If an asymmetric encryption protocol is used, then in a further embodiment both the server and device may generate public-private key pairs, store their respective private keys, and provide their public keys to each other. The server 40 would then sign the command using its private key and encrypt the command using the public key of the client device. When the device 10, 100 receives a command, it decrypts the command using the device's own private key, and then verifies the command using the stored server public key previously provided. In an asymmetric encryption system, the command encryption key may then comprise the device public key used by the server to encrypt the commands sent to the device. In a further embodiment, the command encryption and decryption keys may be transport keys that are used to encrypt and decrypt all communications between the server system 40 and the client device 10, 100, and not merely commands issued by the server system 40 to the client device 10, 100.

Most preferably, the command decryption key is provided to the client device 10, 100 when the device is first registered at the server system 40. By providing a command decryption key to the client device 10, 100 and retaining a corresponding key for encrypting commands to that client device 10, 100, the server system 40 is considered to be the "authoritative" server for that client device. Preferably, the client device 10, 100 is configured to decrypt all command messages received using the command decryption key, extract the command stored in the message, and execute the command; thus, the client device 10, 100 will only execute those commands that were decrypted successfully using the command decryption key. Since the server system 40 is the only server using the corresponding command encryption key, the likelihood that unauthorized instructions issued by a rogue server will be received and executed by the client device 10, 100 is minimal.

The command decryption and encryption keys may be changed from time to time, for example in accordance with IT policies set at the server system 40. In that case, new command decryption keys will be provided to the client device 10, 100. As can be seen in FIG. 5*a*, a set of "Options" 520 is provided for administering the account associated with a selected user and client device. These options may include the option to "Reset Master Key", which generates a new command key pair and causes one of the keys of that new pair to be transmitted to the client device 10, 100.

Because the command decryption key is provided by the authoritative server system 40, in the preferred embodiment when the server system 40 ceases to be the authoritative server for that client device—for example, if the client device 10, 100 is subsequently registered at another server system other than the server system 40—the other server system will itself generate a new command key pair and provide a command decryption key to the client device 10, 100. Thus, the client device 10, 100 will no longer be configured to decrypt and execute commands received from the original server system 40. Preferably, when a client device 10, 100 is registered at a new server system, the new server system issues a command to wipe all previously stored data on the device 10, 100, to change the content encryption key used at the device 10, 100, and to reset the password entered by the user to unlock the device, although this is not mandatory. In the preferred embodiment, the content encryption key used at the client device 10, 100 to encrypt and store data at the device, and the password entered by the user to unlock the device, are not otherwise affected by the provision of a new command decryption key to the client device 10, 100 by the existing server system 40.

Figure 4:
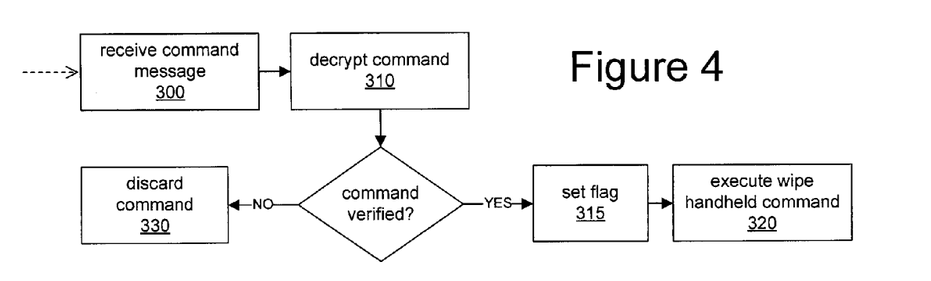
FIG. 4 is a flowchart of a method for handling a "prepackaged" command at a client device.

It will be appreciated that receipt and execution by the client device 10, 100 of a command from the server system 40 will therefore be carried out in the following manner, which is generally illustrated in FIG. 4 with reference to a so-called "kill" command for wiping at least a portion of the data stored on the client device 10, 100 and disabling at least a portion of the applications executable at the client device. A command decryption module at the client device 10, 100, for example one of the modules 424N shown in FIG. 6, receives via the transceiver 411 an incoming message comprising a command at step 300. In the preferred embodiment, the message comprises a packet consisting of the command; either the command itself is encrypted, or the message is encrypted, by the command encryption key. The command decryption module decrypts the message using the command decryption key to extract the command at step 310. If the command is successfully decrypted, the command is verified and can be further processed by the command decryption module.

The client device 10, 100 also comprises a security module for executing certain security-related functions. Again with reference to FIG. 6, the security module may comprise code stored in the non-volatile memory 424 (i.e., one of the various modules indicated as 424N) and executable by the microprocessor 438; alternatively, the module may be provided in an integrated circuit. If, as in the example of FIG. 4, command decryption module identifies the decrypted command as a security command, the command is passed to the security module at the client device 10, 100. The security module, having received the command, interprets the command in FIG. 4 as a "kill" command to erase at least a portion of the data stored in the memory 424 and to disable at least a portion of the applications executable at the client device 10, 100. In response, the security module executes the command by setting a flag that is stored in the persistent memory 424 at step 315, then proceeds to issue instructions at step 320 to the processor 438 to delete at least a portion of the data stored in the memory 424, and to disable at least a portion of the applications executable at the client device 10. In some embodiments, the deletion of data is accomplished by writing either zeroes or ones to the non-volatile memory 424, as well as to portions of the volatile memory 426, and/or by removing all memory references to the data in the non-volatile memory 424 and portions of the volatile memory 426. In a preferred embodiment, the memory 424, 426 is overwritten with zeroes or ones several times. In an alternate embodiment, the data may be encrypted with a randomly generated key prior to deletion.

The flag set in the memory 424 may be a bit or sequence of bits at a predetermined, hidden location in the memory 424, and is set in the event that the client device 10, 100 is powered off before the deletion and/or disablement of applications in response to the security command is completed. The device 10, 100 is preferably configured so that when it is powered on, the security module checks the flag bits during boot-up of the device to determine whether the flag was set; if it was set, the security module aborts any log-in procedure executable on the device and re-issues instructions to the processor 438 to continue with the wipe and disabling process. Thus, the "kill" command cannot be circumvented without erasing the memory 424.

If, after step 310, the command is not verified—for example, if after decryption with the command decryption key, the command does not contain a string of bits identifying the command and/or server system 40—then the command decryption module at the client device 10, 100 discards the command at step 330.

Turning to the server system 40, the "kill" command is issued to a target client device 10, 100 in response to an instruction received by the server system 40, for example from an authorized administrator. As described above, the server system 40 stores registration data associated with the user and the client device 10, 100 in memory accessible at the system 40, for example on a local hard drive. The registration data includes a command encryption key for encrypting commands to be sent to a target client device 10, 100. With reference again to FIG. 5*a*, an administrator may select an option 520 for erasing data stored on the target client device 10, 100 and disabling the device, shown in the figure as "Erase Data and Disable Handheld". The target client device 10, 100 in the embodiment depicted in FIG. 5*a* is the selected device; selection of a particular entry for a target device is shown in the user interface 500 in the shaded region 510. Selection of this option causes a "kill" command for wiping and disabling the device to be packaged in a message addressed to the target client device 10, 100, and transmission of this message to the target device. In the preferred embodiment, the message comprises a packet consisting of the command; either the command itself is encrypted, or the message itself is encrypted, by the command encryption key. It will be appreciated that so long as the registration is stored at the server system 40, the server system 40 will be able to construct a message comprising a "kill" command and transmit the message to the target client device 10, 100. If the registration is removed from the server, which in this embodiment may be carried out by selecting the option "Remove User" provided in the options panel 520 of the user interface 500, then the command encryption key will be deleted along with other information contained in the registration. Removal of the registration at the server 40, however, does not remove the command decryption key or transport key at the target client device 10, 100; the target device is still capable of receiving and processing commands encrypted with the correct key, provided the command decryption key is not deleted or altered at the target device 10, 100.

Figure 2:
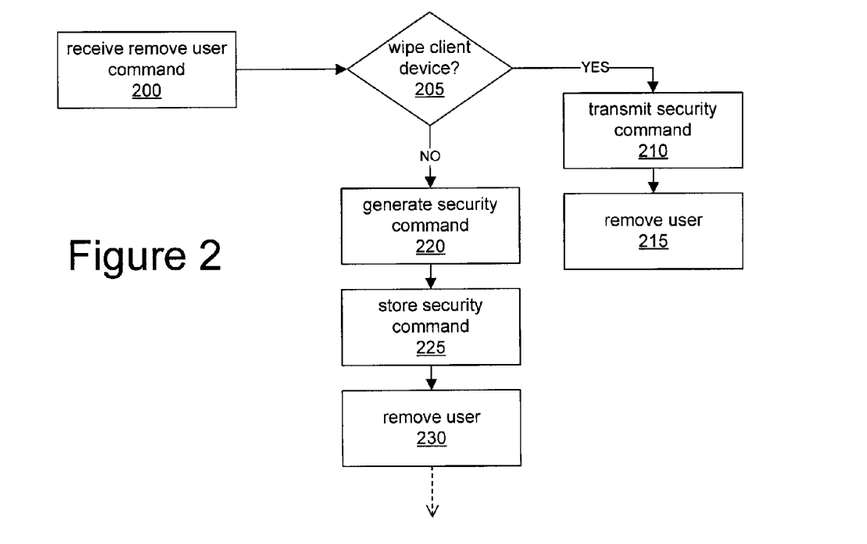
FIG. 2 is a flowchart of a method for handling a remove user command at a server.

However, the circumstance may arise where an administrator wishes to issue a "kill" command to a target client device 10, 100 after the registration had already been removed from the server system 40. Thus, in the preferred embodiment, the server system 40 is provided to automatically generate and store a "pre-packaged" command addressed to the target client device 10, 100. With reference to FIG. 2, the server system 40 receives an instruction to remove a user at step 200. In one embodiment, the server 40 queries the administrator at step 205 via the user interface whether the client device 10, 100 that is the target of the remove user command is to be wiped and/or disabled. If the target client device 10, 100 is to be wiped and/or disabled at that time, then the administrator confirms this step and the server system 40 generates and transmits a message comprising the "kill" command at step 210, as described above. At step 215 the user registration is removed from the server, by deleting the command encryption key along with other information contained in the registration. If the target client device 10, 100 is not to be wiped and/or disabled at that time, which may be the case if the device is expected to be returned to the administrator for redeployment, for example, then in the preferred embodiment no "kill" command is transmitted to the target device 10, 100. Instead, the server system 40 generates a "pre-packaged" security command and stores the command locally at step 220. The "pre-packaged" security command is generated in a similar manner as a command packaged for immediate transmission to the client device. If the command itself is encrypted using the command encryption key, then the server system 40 encrypts the command at step 220 and stores the encrypted command locally at step 225. If messages are encrypted using the command encryption key (i.e., if the command encryption key is a transport key used to encrypt all messages transmitted from the server system 40 to the target client device 10, 100), then the server system 40 generates a message comprising the security command and encrypts it at step 220, then stores the encrypted message at step 225. The stored command is stored in association with at least a device identifier and preferably in association with an address identifier if the message is not prepared with an address at step 220, so that the command can be identified and transmitted at a later date. After the security command is stored at step 225, the server system 40 proceeds to remove the user and device registration from the server system 40 at step 230, thus ensuring that the command encryption key is deleted from the server system 40. It will be appreciated that no other command can subsequently be issued from the server system 40 without recreating the registration at the server, which requires the generation of a new command encryption or transport key and provision of a corresponding decryption key to the target device 10, 100.

Figure 3:
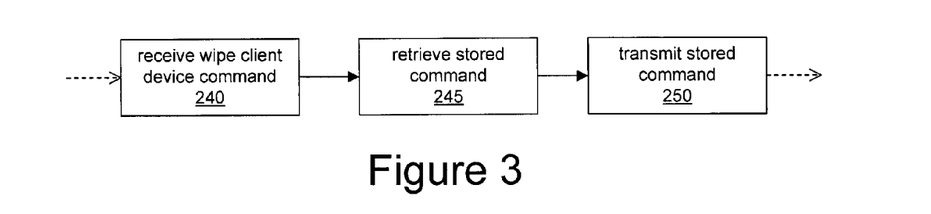
FIG. 3 is a flowchart of a method for issuing a "prepackaged" command to a client device.
Figure 5B:
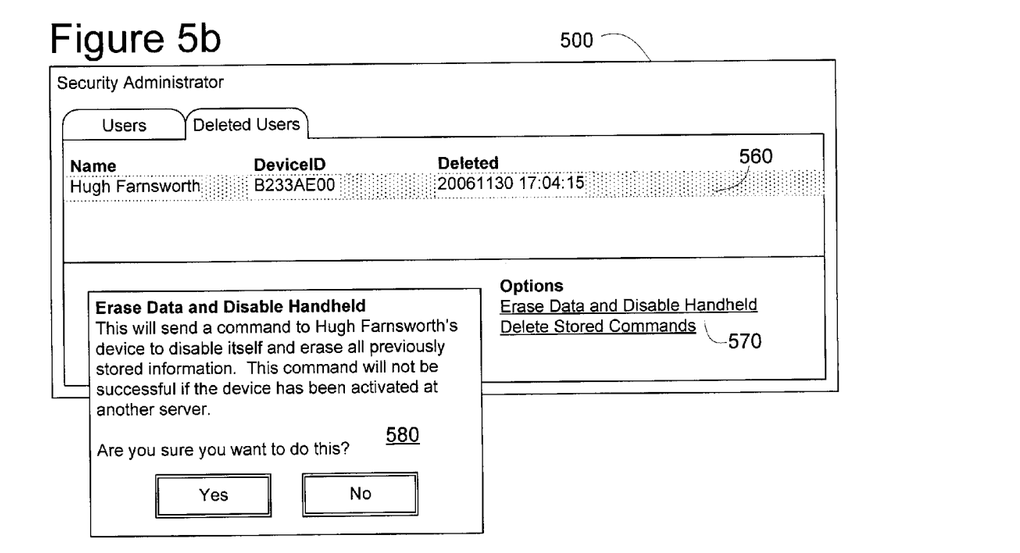

At a later time, if it is determined to be desirable to wipe and/or disable the target client device 10, 100, then an administrator or other authorized user may instruct the server system 40 to transmit the command to the device 10, 100. An example of a user interface for carrying out this process is provided at FIG. 5*b*. The interface 500 includes a listing of deleted users, one of which is a selected deleted user 560. The interface 500 provides a panel comprising possible commands 570 relating to the device, including the option to "Erase Data and Disable Handheld". With reference to FIG. 3, when the server system 40 receives an instruction to wipe and/or disable the target client device 10, 100 at step 240, for example as a result of an administrator selecting the "Erase Data and Disable Handheld" option from the panel 570, the server system 40 retrieves the encrypted command or message from its local store at step 245, and transmits the stored command to the target device 10, 100 at step 250. In the preferred embodiment, the server system 40 may seek confirmation from the administrator that he or she does indeed wish to issue this stored command via the user interface, for example using a dialog box 580. The transmission step may include the step of addressing a message containing the retrieved encrypted command using the stored address identifier.

By deleting the command encryption key, a user at the server system 40 is not able to send any command besides the "pre-packaged" security command stored at the server 40 to the target client device 10, 100. Further, there is no need for the server 40 to retain a copy of the command encryption or transport key for the client device 10, 100 after the registration is removed from the server 40. It will be appreciated that as long as the target client device 10, 100 retains the command decryption key associated with the server system 40, the client device 10, 100 will be capable of decrypting, verifying, and executing the wipe and/or disable command once it is transmitted from the server system 40. It will be further appreciated that if the target device 10, 100 is registered at another server system after the registration is removed from the first server system 40, the device 10, 100 will be provided with a new command decryption key or transport key, and the previous key will be deleted. In that case, if the pre-packaged command is subsequently transmitted from the server system 40, the target client device 10, 100 will be unable to decrypt and verify the command, and will discard the command, which is an appropriate response; as noted above, preferably the new server will have issued a command to wipe all previously stored data on the device 10, 100 as part of the registration process, and the need to execute the stored command sent from the server system 40 would therefore be removed.

In a further embodiment, however, if the target client device 10, 100 is not wiped upon registration with a new server and still retains a copy of the previous command decryption key, then preferably the device 10, 100 is configured to verify the command against stored information relating to the server at which it is currently registered. In this embodiment, the message comprising the security command includes an identifier that identifies the server system 40 as the source of the command. Referring back to FIG. 4, after decrypting the message or command at step 310, the target device 10, 100 verifies that the server identifier corresponds to a previously stored identifier for its currently registered server; if the identifiers do not match, then the target device discards the command at step 330. If the identifiers match, or if the target device 10, 100 does not have a previously stored server identifier, then it proceeds to set the flag and carry out the wipe/disable command at steps 315 and 320.

In a still further embodiment, when the security command is stored at step 225 as shown in FIG. 2, an expiration time is assigned to the stored command, such that after the expiration time has elapsed or passed, the server system 40 automatically deletes the stored command. Deletion of the stored command removes the corresponding listing of the deleted user in the user interface shown in FIG. 5b, thereby keeping the list of deleted accounts at a manageable length. Preferably, the expiration time is set at one week or one month, or a suitable time to allow the administrator to confirm whether a "kill" command needs to be sent to the target device 10, 100. The system may further or alternatively allow the administrator or other authorized user at the server 40 to manually delete the stored command rather than wait for an automatic deletion of the stored command, as shown in the options 570 in FIG. 5b. Preferably, a manual deletion is undertaken when it is finally determined that a "kill" command does not need to be transmitted to the target device 10, 100, for example if the target device is recovered, destroyed, or known to have been wiped.

The systems and methods disclosed herein may be used with many different computers and devices, such as a wireless mobile communications device shown in FIG. 6. With reference to FIG. 6, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 6 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 6 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 preferably provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 430 of the mobile device 100 to the serial port of a computer system or device. The serial port 430 may also be used to enable a user to set preferences through an external device or software application, or to download other application modules 324N for installation. This wired download path may be used to load an encryption key onto the device, which is a more secure method than exchanging encryption information via the wireless network 419. As will be appreciated by those skilled in the art, the methods described in relation to FIGS. 2, 3, and 4 may be carried out with a mobile communication device 100 over either the wired path or a wireless network. Interfaces for other wired download paths may be provided in the mobile device 100, in addition to or instead of the serial port 430. For example, a USB port would provide an interface to a similarly equipped personal computer.

A short-range communications subsystem 440 is also included in the mobile device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method for issuing a security command for remote execution at a target mobile device associated with a user, the method comprising:
generating, by a computing device, an encrypted security command for the target mobile device, while the computing device stores registration data for the user and the target mobile device, wherein the registration data comprises a command encryption key for encrypting a security command for the target mobile device, and wherein the encrypted security command is generated by encrypting the security command using the command encryption key;
storing the encrypted security command in memory of the computing device, wherein the encrypted security command comprises a command to wipe or disable the target mobile device;
after the computing device no longer stores the registration data, receiving, by the computing device, an instruction to wipe or disable the target mobile device; and
in response to receiving the instruction:
retrieving, by the computing device, the stored encrypted security command from the memory of the computing device; and
transmitting, by the computing device, the retrieved encrypted security command to the target mobile device for decryption by the target mobile device using a command decryption key corresponding to the command encryption key.

2. The method of claim 1, wherein the transmitting the retrieved encrypted security command comprises inserting the retrieved encrypted security command in a message addressed to the target mobile device.

3. The method of claim 1, wherein the generating the encrypted security command comprises inserting the security command in a message addressed to the target mobile device, and encrypting the message using the command encryption key; wherein the storing the encrypted security command comprises storing the encrypted message; and wherein the retrieving the stored encrypted security command comprises retrieving the stored encrypted message and the transmitting the retrieved encrypted security command comprises transmitting the retrieved encrypted message to the target mobile device.

4. The method of claim 1, further comprising deleting the command encryption key.

5. The method of claim 4, wherein the command encryption key is deleted in response to a command to delete the registration data associated with the target mobile device.

6. The method of claim 5, wherein the generating the encrypted security command for the target mobile device and the storing the encrypted security command are carried out upon receipt of the command to delete the registration data but before deletion of the registration data.

7. The method of claim 1, wherein the command encryption key is part of a symmetric key pair.

8. The method of claim 1, wherein the command encryption key is part of an asymmetric key pair.

9. The method of claim 1, wherein the storing the encrypted security command further comprises assigning an expiration time to the stored encrypted security command, such that the stored encrypted security command is automatically deleted at the expiration time.

10. The method of claim 1, further comprising deleting the stored encrypted security command in response to a received command to delete the stored encrypted security command.

11. The method of claim 1, wherein the security command comprises a command to erase at least a portion of data stored at the target mobile device.

12. The method of claim 1, wherein the security command comprises a command to disable access to at least one application executable at the target mobile device.

13. An apparatus for issuing a security command for remote execution at a target mobile device associated with a user, the apparatus comprising:
a memory and a processor, the processor configured to:
store registration data for the user and the target mobile device, the registration data comprising a command encryption key for encrypting a security command for the target mobile device;

while the registration data is stored, generate an encrypted security command for the target mobile device by encrypting the security command using the command encryption key, and store the encrypted security command in the memory, wherein the encrypted security command comprises a command to wipe or disable the target mobile device;

after the registration data comprising the command encryption key is no longer stored, receive an instruction to wipe or disable the target mobile device; and in response to receiving the instruction, retrieve the stored encrypted security command from the memory and transmit the retrieved encrypted security command to the target mobile device for decryption by the target mobile device using a command decryption key corresponding to the command encryption key.

14. The apparatus of claim 13, wherein the processor is configured to:

insert the security command in a message addressed to the target mobile device and encrypt the message using the command encryption key when generating the encrypted security command;

store the encrypted message when storing the encrypted security command;

retrieve the stored encrypted message when retrieving the stored encrypted security command; and transmit the retrieved encrypted message when transmitting the retrieved encrypted security command.

15. The apparatus of claim 13, wherein the command encryption key is part of a symmetric key pair.

16. The apparatus of claim 13, wherein the command encryption key is part of an asymmetric key pair.

17. The apparatus of claim 13, wherein the processor is further configured to assign an expiration time to the stored encrypted security command, such that the stored encrypted security command is automatically deleted at the expiration time.

18. The apparatus of claim 13, wherein the processor is further configured to delete the stored encrypted security command in response to a received command to delete the stored encrypted security command.

19. The apparatus of claim 13, wherein the security command comprises a command to erase at least a portion of data stored at the target mobile device.

20. The apparatus of claim 13, wherein the security command comprises a command to disable access to at least one application executable at the target mobile device.

21. A non-transitory computer-readable medium comprising computer-executable instructions which, when executed by a processor of a computing device, result in:

while the computing device stores registration data for a target mobile device associated with a user, the registration data comprising a command encryption key for encrypting a security command for the target mobile device, the computing device generating an encrypted security command for the target mobile device by encrypting the security command using the command encryption key, and storing the encrypted security command in memory of the computing device, wherein the encrypted security command comprises a command to wipe or disable the target mobile device;

after the computing device no longer stores the registration data comprising the command encryption key, the computing device receiving an instruction to wipe or disable the target mobile device; and in response to receiving the instruction, the computing device retrieving the stored encrypted security command from the memory of the computing device and transmitting the retrieved encrypted security command to the target mobile device for decryption by the target mobile device using a command decryption key corresponding to the command encryption key.

* * * * *